US012619535B2

(12) United States Patent
Underwood et al.

(10) Patent No.: US 12,619,535 B2
(45) Date of Patent: May 5, 2026

(54) INVALIDATE-WRITE HAZARD DETECTION

(71) Applicant: Arm Limited, Cambridge (GB)

(72) Inventors: Mark Underwood, Cambridge (GB);
Ole Henrik Jahren, Trondheim (NO);
Harsh Ashok Gugale, Austin, TX (US)

(73) Assignee: Arm Limited, Cambridge (GB)

( * ) Notice: Subject to any disclaimer, the term of this
patent is extended or adjusted under 35
U.S.C. 154(b) by 0 days.

(21) Appl. No.: 18/737,261

(22) Filed: Jun. 7, 2024

(65) Prior Publication Data

US 2025/0378027 A1      Dec. 11, 2025

(51) Int. Cl.
*G06F 12/00* (2006.01)
*G06F 12/0802* (2016.01)
(52) U.S. Cl.
CPC ...... *G06F 12/0802* (2013.01); *G06F 2212/60*
(2013.01)
(58) Field of Classification Search
CPC .......................... G06F 12/0802; G06F 2212/60
See application file for complete search history.

(56) References Cited

U.S. PATENT DOCUMENTS

| | | | | |
|---|---|---|---|---|
| 5,809,280 | A | * | 9/1998 | Chard ........................ G06F 7/78 |
| | | | | 711/E12.074 |
| 6,286,082 | B1 | * | 9/2001 | Moudgal ............. G06F 12/0804 |
| | | | | 710/39 |
| 9,244,837 | B2 | * | 1/2016 | Bhoria .................... G06F 12/08 |
| 11,030,103 | B2 | | 6/2021 | Robinson et al. |

| | | | | |
|---|---|---|---|---|
| 12,197,340 | B2 | * | 1/2025 | Smekalov ........... G06F 12/1036 |
| 2010/0174893 | A1 | * | 7/2010 | Rivera ................ G06F 9/30014 |
| | | | | 712/E9.06 |
| 2015/0378925 | A1 | | 12/2015 | Misra |
| 2018/0285105 | A1 | * | 10/2018 | Wang .................. G06F 9/30047 |
| 2019/0050332 | A1 | | 2/2019 | Alameldeen et al. |
| 2020/0218665 | A1 | * | 7/2020 | Swaine ............... G06F 12/1009 |
| 2021/0117323 | A1 | * | 4/2021 | Kazi .................... G06F 12/0802 |
| 2021/0311997 | A1 | * | 10/2021 | Grocutt ............. G06F 16/90339 |

(Continued)

FOREIGN PATENT DOCUMENTS

| | | | | | |
|---|---|---|---|---|---|
| CA | 1324221 | C | * | 11/1993 | ......... G06F 12/0808 |
| CN | 1784663 | A | * | 6/2006 | ......... G06F 12/1036 |
| CN | 102236541 | A | * | 11/2011 | ......... G06F 12/0862 |

(Continued)

OTHER PUBLICATIONS

Combined Search and Examination Report for GB Application No.
2505977.5 dated Oct. 21, 2025, 10 pages.

*Primary Examiner* — Shawn X Gu
*Assistant Examiner* — Mohammad S Hasan
(74) *Attorney, Agent, or Firm* — NIXON &
VANDERHYE P.C.

(57) ABSTRACT

An apparatus comprises invalidation range tracking circuitry
to track at least one invalidation target address range speci-
fied as a target for cache invalidation; cache invalidation
circuitry to request invalidation of cache entries correspond-
ing to addresses in said at least one invalidation target
address range tracked by the invalidation range tracking
circuitry; and invalidate-write hazard detection circuitry to
detect invalidate-write hazards based on a comparison of a
write target address specified by a memory write request
with the at least one invalidation target address range tracked
by the invalidation range tracking circuitry.

20 Claims, 8 Drawing Sheets

(56)          References Cited

U.S. PATENT DOCUMENTS

| | | | | |
|---|---|---|---|---|
| 2022/0206953 A1* | 6/2022 | Byun | .................. | G06F 12/0253 |
| 2024/0143510 A1* | 5/2024 | Smekalov | ........... | G06F 12/1441 |

FOREIGN PATENT DOCUMENTS

| | | | | | | |
|---|---|---|---|---|---|---|
| CN | 104903873 | A | * | 9/2015 | ......... | G06F 9/30047 |
| CN | 117461027 | A | * | 1/2024 | ......... | G06F 12/1027 |
| EP | 0470574 | A2 | * | 2/1992 | ......... | G06F 12/0833 |
| EP | 3210149 | B1 | * | 7/2020 | ............. | G06F 9/323 |
| EP | 3889787 | | | 10/2021 | | |
| JP | H0588969 | A | * | 4/1993 | | |
| JP | H08166905 | A | * | 6/1996 | | |

* cited by examiner

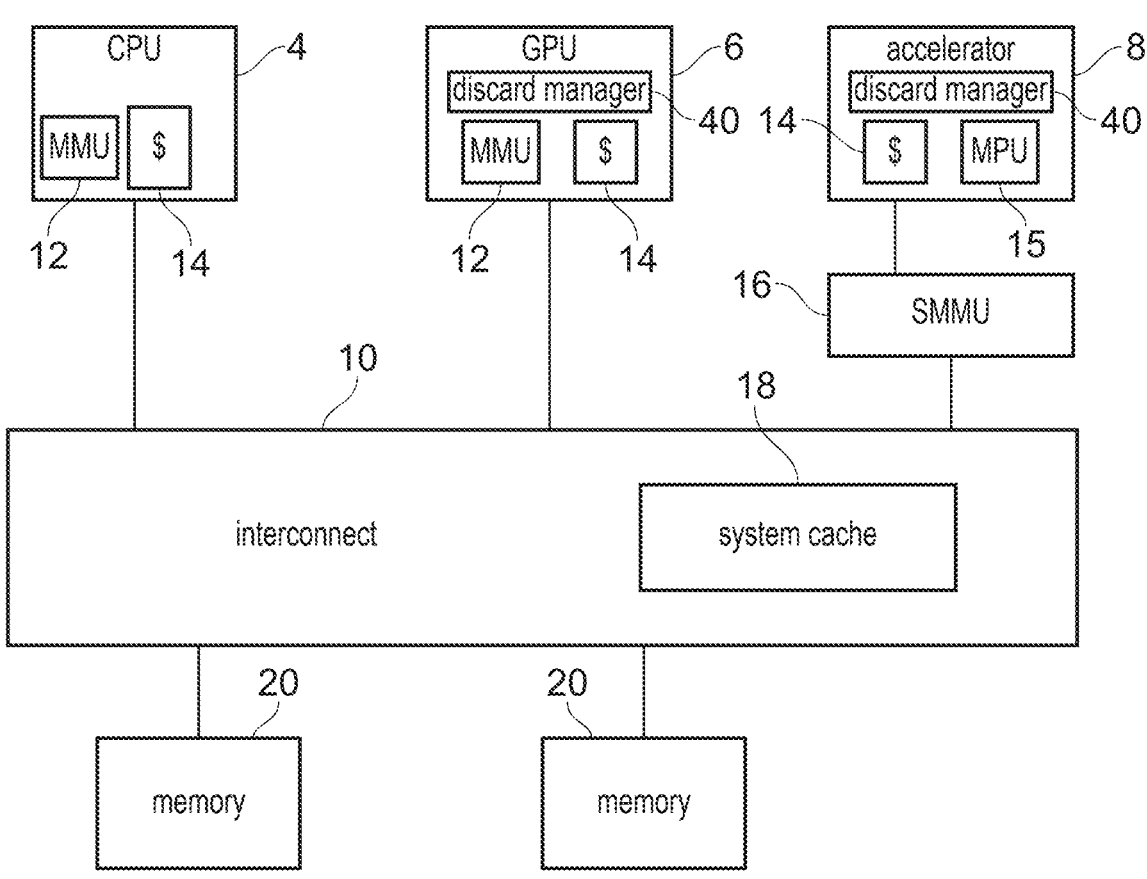
FIG. 1

Discard manager

| Context ID | Start | End | Valid | Hazard | Invalidating |
|---|---|---|---|---|---|
| Context A | 0xA0000 | 0xA7FFF | 1 | 1 | 0 |
| Context B | 0x40000 | 0x7FFFF | 1 | 0 | 0 |
| . . . | . . . | . . . | . . . | . . . | . . . |

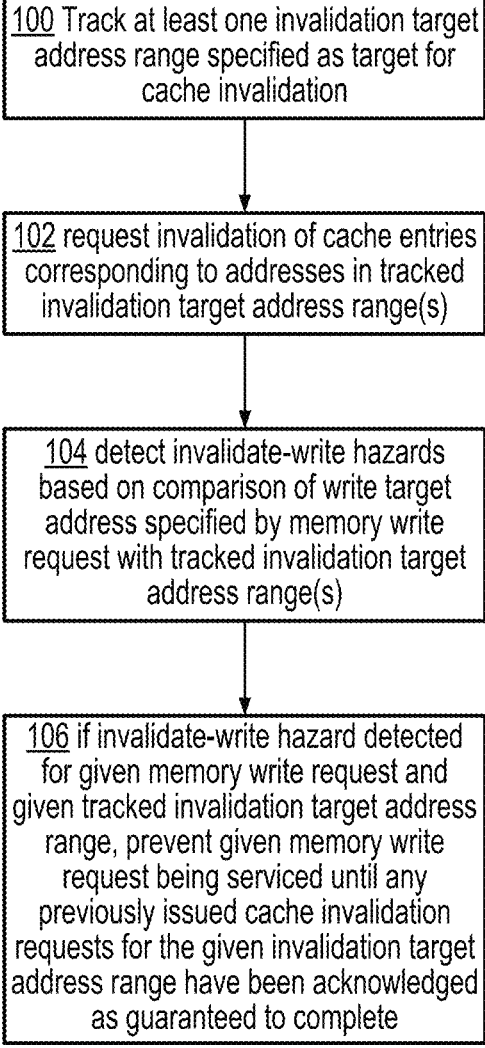

<u>100</u> Track at least one invalidation target address range specified as target for cache invalidation <u>102</u> request invalidation of cache entries corresponding to addresses in tracked invalidation target address range(s)

<u>104</u> detect invalidate-write hazards based on comparison of write target address specified by memory write request with tracked invalidation target address range(s)

<u>106</u> if invalidate-write hazard detected for given memory write request and given tracked invalidation target address range, prevent given memory write request being serviced until any previously issued cache invalidation requests for the given invalidation target address range have been acknowledged as guaranteed to complete

FIG. 5

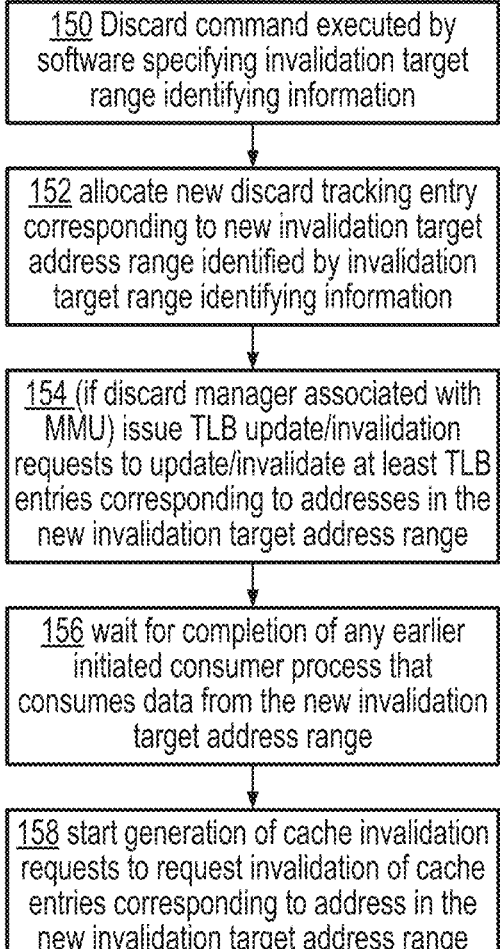

150 Discard command executed by software specifying invalidation target range identifying information 152 allocate new discard tracking entry corresponding to new invalidation target address range identified by invalidation target range identifying information 154 (if discard manager associated with MMU) issue TLB update/invalidation requests to update/invalidate at least TLB entries corresponding to addresses in the new invalidation target address range 156 wait for completion of any earlier initiated consumer process that consumes data from the new invalidation target address range 158 start generation of cache invalidation requests to request invalidation of cache entries corresponding to address in the new invalidation target address range

FIG. 6

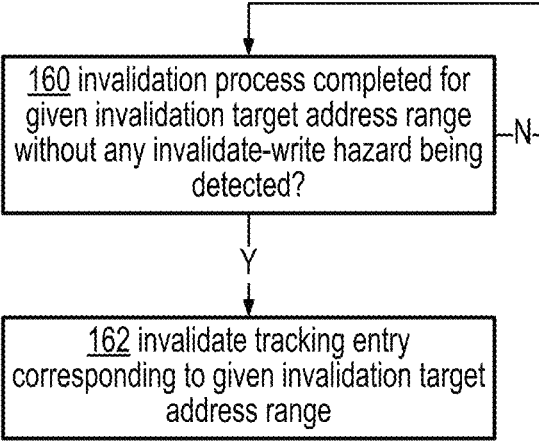

160 invalidation process completed for given invalidation target address range without any invalidate-write hazard being detected?

N

Y 162 invalidate tracking entry corresponding to given invalidation target address range

FIG. 7

INVALIDATE-WRITE HAZARD DETECTION

BACKGROUND

Technical Field

The present technique relates to the field of data processing.

Technical Background

A data processing system may have a cache for caching data from memory for faster access. Cache capacity may be limited and so when new data is to be allocated into the cache, other data may need to be evicted to make way for the new data. If the evicted data is dirty (has been modified relative to the corresponding data in memory), eviction of the dirty data may trigger a writeback of the dirty data back to the memory.

SUMMARY

At least some examples of the present technique provide an apparatus comprising:
  invalidation range tracking circuitry to track at least one invalidation target address range specified as a target for cache invalidation;
  cache invalidation circuitry to request invalidation of cache entries corresponding to addresses in said at least one invalidation target address range tracked by the invalidation range tracking circuitry; and
  invalidate-write hazard detection circuitry to detect invalidate-write hazards based on a comparison of a write target address specified by a memory write request with the at least one invalidation target address range tracked by the invalidation range tracking circuitry.

At least some examples of the present technique provide a system comprising:
  the apparatus described above, implemented in at least one packaged chip;
  at least one system component; and
  a board,
  wherein the at least one packaged chip and the at least one system component are assembled on the board.

At least some examples of the present technique provide a chip-containing product comprising the system described above, wherein the system is assembled on a further board with at least one other product component.

At least some examples of the present technique provide a non-transitory computer-readable medium storing computer-readable code for fabrication of an apparatus comprising:
  invalidation range tracking circuitry to track at least one invalidation target address range specified as a target for cache invalidation;
  cache invalidation circuitry to request invalidation of cache entries corresponding to addresses in said at least one invalidation target address range tracked by the invalidation range tracking circuitry; and
  invalidate-write hazard detection circuitry to detect invalidate-write hazards based on a comparison of a write target address specified by a memory write request with the at least one invalidation target address range tracked by the invalidation range tracking circuitry.

At least some examples of the present technique provide a method comprising:
  tracking, using invalidation range tracking circuitry, at least one invalidation target address range specified as a target for cache invalidation;
  requesting invalidation of cache entries corresponding to addresses in said at least one invalidation target address range tracked by the invalidation range tracking circuitry; and
  detecting invalidate-write hazards based on a comparison of a write target address specified by a memory write request with the at least one invalidation target address range tracked by the invalidation range tracking circuitry.

Further aspects, features and advantages of the present technique will be apparent from the following description of examples, which is to be read in conjunction with the accompanying drawings.

BRIEF DESCRIPTION OF THE DRAWINGS

FIG. 1 illustrates an example of a data processing apparatus;

FIG. 4 illustrates an example of tracking entries of the invalidation range tracking circuitry;

FIG. 5 illustrates steps for detection of invalidate-write hazards;

FIG. 6 illustrates steps for allocation of a new invalidation target address range;

FIG. 7 illustrates steps for invalidation of an entry of the invalidation range tracking circuitry;

DESCRIPTION OF EXAMPLES

Figure 2:
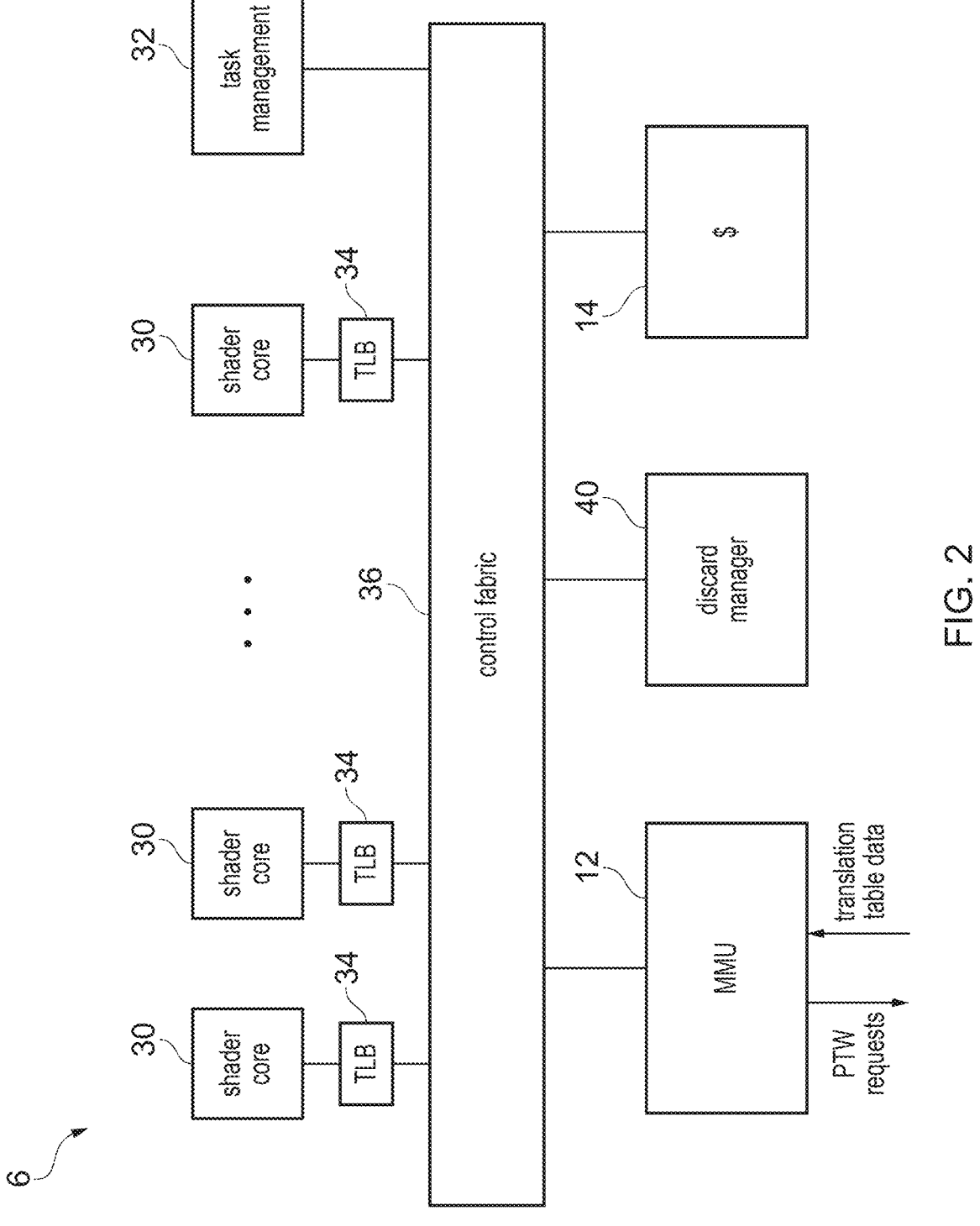
FIG. 2 illustrates an example of a graphics processing unit (GPU) comprising a discard manager.

There can be some processing workloads for which dirty cached data associated with a given range of addresses is temporarily needed for a time, but then will never be used again once processing has progressed beyond a certain point. For example, the dirty cached data could correspond to results of an intermediate phase of processing (e.g. a given render pass applied to an image frame in a graphics processing workload) which may not be needed again once it has been consumed by the next phase of processing (e.g. a subsequent render pass on the same frame). However, if the data remains dirty in the cache beyond the point at which the consumer processing is done with it, there can be a power and bandwidth cost in writing back the dirty cached data back to memory when the data is naturally evicted at a later time due to the cache capacity being needed for other data. It is estimated that, for some workloads, a non-trivial (e.g. around 30%) of memory system bandwidth utilisation can be consumed in writing back dirty cached data that has already completed its useful lifetime and will no longer be accessed by any subsequent memory read operation. Hence, it can be useful to support cache invalidation circuitry which can request invalidation of cache entries corresponding to addresses in a specified invalidation target address range. By providing a mechanism to identify a range of addresses for which cache entries can be invalidated, rather than written back to memory, this can help conserve memory system bandwidth, therefore reducing power consumption and improving performance by conserving available bandwidth for more useful data transfers.

However, when such cache invalidations corresponding to a given address range are supported, there can be a challenge in managing invalidate-write hazards. The address range specified for invalidation may be relatively large and so it can take some time to actually invalidate all the cache entries relating to the specified range of addresses. There can be a risk that the addresses subject to cache invalidation may start to be reused for other purposes by software while the invalidation process is still ongoing, so that a memory write request is issued to one of the addresses in the invalidation target address range before the invalidation is complete. This could risk error if a memory write request for a given address was serviced before the invalidation is carried out for the corresponding cache entry, because this could risk the updated data stored to the cache in response to the memory write request being lost when the corresponding cache entry is subsequently invalidated. Therefore, a mechanism to protect against invalidate-write hazards may be provided.

One way to provide such protection may be to rely on software to implement appropriate protection against invalidate-write hazards. For example, the software could include one or more barrier instructions to ensure that a subsequent process reusing the address range being invalidated cannot start until the invalidation of all affected cache entries corresponding to the specified address range is complete. Alternatively, the software could cause translation table entries or memory protection entries defining access permissions for the range of addresses being invalidated to be temporarily set to "read-only" permission until the invalidation is complete, to ensure writes conflicting with the invalidation are rejected until the invalidation process is complete. However, such mechanisms may be onerous for software developers to implement, and may be error prone as some software developers may forget to include the appropriate protection mechanisms. Also, these software based mechanisms may incur significant performance costs due to the delays incurred by the barrier, or by the memory access permission updates and handling of increased frequency of memory faults caused by writes to a read-only region of memory.

Hence, an apparatus comprises invalidation range tracking circuitry to track at least one invalidation target address range specified as a target for cache invalidation; cache invalidation circuitry to request invalidation of cache entries corresponding to addresses in said at least one invalidation target address range tracked by the invalidation range tracking circuitry; and invalidate-write hazard detection circuitry to detect invalidate-write hazards based on a comparison of a write target address specified by a memory write request with the at least one invalidation target address range tracked by the invalidation range tracking circuitry. This can provide a hardware mechanism for invalidate-write hazard detection so that the burden on software developers can be eased and it becomes feasible for a software process that reuses an address range subject to invalidation to start even if the invalidation is not complete yet. Also, the need for software to make temporary updates to memory access permissions can be avoided. The hardware can track the range of addresses specified as a target for cache invalidation and compare a write target address of a memory write request with the invalidation target address range tracked by the invalidation range tracking circuitry, to enable invalidate-write hazards to be detected more efficiently. Therefore, the overhead of invalidate-write hazard detection can be greatly reduced, reducing burden on software developers and making it more feasible to support power savings and more efficient utilisation of memory system bandwidth by triggering cache invalidations on ranges of addresses whose data is known no longer to be required.

When the cache invalidation circuitry requests invalidation of cache entries corresponding to addresses in the at least one invalidation target address range tracked by the invalidation range tracking circuitry, the cache entries corresponding to those addresses may be discarded (invalidated without writing back the data from those cache entries to memory), even if the data in the invalidated cache entries is dirty. This can help save memory system bandwidth as discussed above by eliminating memory traffic for writeback operations which relate to data flagged as no longer being needed.

In response to detecting an invalidate-write hazard for a given memory write request which specifies a write target address in a given invalidation target address range tracked by the invalidation range tracking circuitry, when at least one cache invalidation request has already been issued for the given invalidation target address range, the invalidation-write hazard detection circuitry may prevent the given memory write request being serviced until each cache invalidation request previously issued for the given invalidation target address range has been acknowledged as being guaranteed to complete. This helps avoid potential errors which could otherwise occur if a cache entry written to by the memory write request was subsequently invalidated by a remaining part of the cache invalidation process initiated prior to issuing of the memory write request.

The apparatus may comprise memory permissions checking circuitry to perform a permissions check for a memory access request based on permissions data associated with a target address of the memory access request.

Although some examples may implement the invalidation-write hazard detection circuitry entirely independently from the memory permissions checking circuitry, it can be useful to reuse infrastructure already provided for memory permissions checking for the purpose of invalidate-write hazard detection.

For example, in response to detecting an invalidate-write hazard for a given memory write request, the invalidation-write hazard detection circuitry may prevent the memory permissions checking circuitry indicating that the permissions check for the given memory write request is successful until the invalidate-write hazard is resolved. This can be an efficient way of ensuring that the given memory write request cannot be serviced until the invalidate-write hazard is resolved, as there may already be a mechanism by which memory access requests trigger a response indicating whether or not the memory permissions check is passed or failed, and so by preventing a successful memory permissions check being signalled until the invalidate-write hazard is resolved, this ensures the risk of an invalidate-after-write hazard can be mitigated against without needing a further signalling mechanism to prevent the write being serviced. An existing signalling mechanism relating to the permissions check can be reused for ensuring that writes subject to an invalidate-write hazard are delayed until the invalidate-write hazard is resolved.

In some examples, when an invalidate-write hazard is detected for a given memory write request, the permissions check itself could be delayed for the given memory write request, until the invalidate-write has been resolved. Alternatively, the permissions check could still be performed despite presence of the hazard, but signalling of an indication that the permissions check is successful could be delayed until the invalidate-write hazard has been resolved (even if the permissions check is actually determined to be successful before the invalidate-write hazard has been resolved), to prevent the given memory write request progressing beyond the permissions check stage of processing if there is still a risk that a cache entry written to by the given memory write request could be subject to an invalidation which is part of the ongoing cache invalidation process to an invalidation target address range including the target address of the given memory write request.

In some examples, in response to a permissions check request received by the memory permissions checking circuitry specifying a given write target address for which the permissions check is requested corresponding to a given memory write request, the invalidate-write hazard detection circuitry may compare the given write target address specified by the permissions check request with the at least one invalidation target address range to determine whether an invalidate-write hazard is detected for the given memory write request. Hence, an efficient way to implement the hazard detection can be to reuse some of the mechanisms already provided for signalling permissions check requests to the memory permissions checking circuitry. This can be particularly helpful where multiple processing units (e.g. shader cores in a graphics processing unit) share an instance of the memory permissions checking circuitry, so that implementing the hazard detection at the point where permissions check requests are received by the memory permissions checking circuitry can be more efficient than checking for invalidate-write hazards at each individual processing unit.

There can be a number of different ways of implementing the memory permissions checking circuitry.

In some examples, the memory permissions checking circuitry comprises memory management circuitry to obtain translation table data corresponding to the target address of the memory access request, the translation table data specifying the permissions data and address translation mapping information. In this example, the permissions check may comprise checking the permissions data specified by translation table data corresponding to the given write target address (e.g. checking whether a page of addresses corresponding to the given write target address has write permission). The permissions check request may in this case be a translation request sent to the memory management circuitry to request that the memory management circuitry obtains (e.g. from memory) translation table data corresponding to the given write target address. The given write target address may be specified as a virtual address which is to be translated into an intermediate address or physical address using the address translation mapping information specified by the translation table data, or as an intermediate address to be translated to a physical address using the address translation mapping information specified by the translation table data (the intermediate address being an intermediate result of processing a virtual address in a two-stage address translation process where a first stage of address translation from virtual address to intermediate address is performed based on first-stage translation mappings specified in first-stage page tables and a second stage of address translation from intermediate address to physical address is performed based on second-stage translation mappings specified in second-stage page tables). Where memory management circuitry is provided, the invalidate-write hazard detection operation for a given write request may be triggered by receipt of a translation request specifying the write target address for that given write request.

The apparatus may comprise at least one translation lookaside buffer (TLB) to cache address translation data, and trigger issuing of a translation request (also serving as the permissions check request mentioned earlier) to the memory management circuitry in response to detecting a miss in the at least one TLB. In response to allocation of a new invalidation target address range to be tracked by the invalidation range tracking circuitry, the invalidation range tracking circuitry may trigger the at least one translation lookaside buffer to invalidate or update translation lookaside buffer entries corresponding to the new invalidation target address range to indicate that a subsequent memory write request specifying an address corresponding to the new invalidation target address range should cause the translation request to be issued to the memory management circuitry. For example, depending on implementation, the TLB entries corresponding to the new invalidation target address range could be invalidated; updated to a state in which the TLB entry indicates read-only permission for the corresponding page of memory address space (i.e. any previously indicated write permission can be removed from that TLB entry); or updated to a state in which the TLB entry indicates that any write requests to the corresponding page (although not necessarily denied access permission) would require a translation request to be sent to the memory management circuitry.

By invalidating or updating TLB entries relating to a new range of addresses being allocated for tracking for invalidate-write hazards to a state which will force subsequent TLB lookups performed for write requests to addresses in the new invalidation target address range to cause a translation request to be sent to the memory management circuitry, this helps to support the efficient hazard detection mechanism mentioned above in which the invalidate-write hazard checks are triggered by receipt of a translation request by the memory management circuitry. In particular, this approach can be useful for a system where a memory management unit is associated with a number of distributed TLBs, as it means that the invalidation-write hazard detection can be implemented at the central memory management unit rather than needing separate hazarding logic at each individual TLB. This can be more efficient to implement in hardware.

In some examples, the TLB entry invalidation or updates triggered based on allocation of a new invalidation target address range may specifically target those TLB entries corresponding to the new invalidation target address range. However, in practice, precisely specifying invalidation/update requests targeting only TLB entries associated with the new invalidation target address range may require more complex signalling (e.g. may require a large number of individual requests per page within the new invalidation target address range). Hence, some implementations may support an approach which guarantees invalidating or updating at least the TLB entries corresponding to the new invalidation target address range, but which might also invalidate or update some additional TLB entries not corresponding to the new invalidation target address range. For example, in some implementations, in response to the allocation of a new invalidation target address to be tracked by the invalidation range tracking circuitry, the invalidation range tracking circuitry may simply cause the TLB(s) to invalidate or update all the TLB entries associated with a particular address translation context (or even to invalidate or update all TLB entries regardless of address translation context), regardless of which address corresponds to those TLB entries. This may be simpler to implement in hardware, reduce the signalling bandwidth needed to communicate the TLB invalidations/updates required (e.g. a single TLB request may suffice rather than many separate requests per page of addresses) and in many cases may not significantly reduce performance.

In other examples, the memory permissions checking circuitry may comprise memory protection circuitry (rather than memory management circuitry). Memory protection circuitry may be circuitry which checks access permissions defined for regions of address space defined by memory protection entries, each memory protection entry specifying information identifying a start address and an end address of a corresponding region of address space (the start and end addresses could each be identified explicitly as absolute addresses, or one of the start/end addresses could be identified as a relative address, defined by an offset or range size parameter applied relative to the other of the start/end addresses). As start and end addresses are defined by separate parameters, each memory protection entry may support the ability to define an address region of a size other than an exact power-of-2 number of bytes of address space (in contrast, the translation table structures used by memory management units to define access permissions for memory pages tend to have indexing mechanisms which restrict each translation table entry to correspond to an exact power-of-2 number of bytes). Where a memory protection unit (MPU) is provided, it may act as a central point to which permissions check requests are made associated with memory write requests, and at which the memory write requests can be held back from being allowed to proceed until the required permissions checks based on the memory protection entries are complete. Hence, this infrastructure can be reused for enforcement of invalidate-write hazard checks, to prevent signalling of successful MPU permission checks for a given memory write request until that request is clear of any invalidate-write hazards.

Allocation of a new invalidation target address ranges to be tracked by the invalidation tracking circuitry may be controlled by software. The hardware may support at least one software command which software can use to trigger the allocation of a new invalidation target address range to be tracked by the invalidation range tracking circuitry (and for which the cache invalidation circuitry should trigger cache invalidations of corresponding entries). Hence, in response to a software command specifying invalidation target range identifying information, the invalidation range tracking circuitry is configured to allocate, as a new invalidation target address range, a range of addresses identified by the invalidation target range identifying information.

The invalidation tracking circuitry could track the at least one invalidation target address range in different ways. In some examples, the invalidation target address range could be tracked as a range of physical addresses, and so the invalidation-write detection may be based on comparing a physical address of a given memory write request with information defining the invalidation target physical address range. This could be useful in cases where the invalidation-write hazard detection is implemented in association with a memory protection unit which performs its memory permissions checks based on looking up memory protection entries based on a physical address.

However, it can be particularly useful in some examples for the invalidation range tracking circuitry to track each invalidation target address range as a range of virtual addresses or a range of intermediate addresses. This can be useful in cases where the memory permissions checking circuitry comprises memory management circuitry (which receives virtually addressed or intermediate addressed translation requests) or memory protection circuitry which performs its permission checks based on looking up a given virtual/intermediate address in its memory protection entries (e.g. a memory protection unit operating upstream from a point at which the virtual/intermediate addresses are translated to physical addresses). Hence, in some examples the invalidate-write hazard detection circuitry detects invalidate-write hazards based on a comparison of a write target virtual address specified by a memory write request with the at least one invalidation target virtual address range tracked by the invalidation range tracking circuitry. This approach can be seen as counterintuitive, because most memory hazard checking operations are typically based on comparisons of physical address, rather than virtual address. However, it is recognised that performing the hazarding based on virtual address or intermediate address can be much more efficient, as it means that even if the invalidation target virtual/intermediate address range is large and is fragmented across many discontiguous regions of physical memory, the addresses subject to invalidation can be represented by less tracking data than would be the case if each distinct discontiguous block of physical memory being invalidated had to be tracked based on physical address. Also, in cases where the software driver that generates invalidation (discard) commands cannot be trusted, tracking invalidations by virtual address or intermediate address can be more secure than tracking invalidations by physical address, as it prevents the untrusted driver requesting invalidation of data from physical addresses not "owned" by that driver (which might cause data loss or incorrect behaviour for other processes or for a kernel/hypervisor).

One might think that, as it is possible for two or more aliasing virtual/intermediate addresses to be mapped to the same physical address, there is a risk that the invalidate-write hazard detection based on virtual or intermediate addresses might not detect a hazard between a cache invalidation triggered for a first virtual/intermediate address and a write specifying a second virtual/intermediate address mapped to the same physical address as the first virtual/intermediate address. However, in practice this risk is very low (as, for the types of workloads that may be likely to designate large virtual address ranges as being candidates for cache invalidation because their dirty data is no longer required, such workloads do not tend to use complex mappings mapping multiple virtual addresses to the same physical address). As the risk is very low, it may not be considered justified to incur circuit area cost on providing hazard detection logic which would be able to detect cases of hazards between a cache invalidate request and a write request specifying different aliasing virtual/intermediate addresses that map to the same physical address. Instead, it can be the responsibility of the software developer to ensure that, in cases where the address space has been configured to include multiple virtual/intermediate addresses aliasing to the same physical address, the software does not issue the cache invalidation command at all (it can be regarded as a programming error for the cache invalidation tracker to be invoked to discard no longer needed data from caches, in cases where aliasing between virtual/intermediate addresses mapping to the same physical addresses occurs for the part of the address space subject to the cache invalidation). Hence, even when tracking the invalidations based on virtual or intermediate addresses, there is no need to provide circuitry for detecting hazards between different aliasing virtual or intermediate addresses that map to the same physical address. It can be sufficient for the invalidate-write hazard detection to detect invalidate-write hazards based on a comparison of a write target virtual address against a virtual address range tracked by the invalidation range tracking circuitry or a comparison of a write target intermediate address against an intermediate address range tracked by the invalidation range tracking circuitry, In examples where the invalidation target address range is tracked as a range of virtual addresses or a range of intermediate addresses, each invalidation target address range tracked by the invalidation range tracking circuitry may be associated with an address translation context identifier; and the invalidate-write hazard detection circuitry may determine whether an invalidate-write hazard occurs for a given memory write request specifying a given write target address associated with a target address translation context, in response to detecting that the given write target address specified by the given memory write request is within an invalidation target address range associated with said target address translation context. If a write is detected to an address in a given invalidation target virtual address range but the memory write request is associated with a different address translation context to the context tracked for that given invalidation target virtual address range, an invalidate-write hazard is not detected for that memory write request.

In some examples, following allocation of a given invalidation target address range to be tracked by the invalidation range tracking circuitry, the cache invalidation circuitry may start, in response to detection of completion of a consumer task that consumes data from addresses in the given invalidation target address range, generation of cache invalidation requests requesting invalidation of cache entries corresponding to addresses in the given invalidation target address range (rather than the invalidation starting immediately once the given invalidation target address range has been allocated to the invalidation range tracking circuitry). In some cases, generation of cache invalidation requests for a given range of addresses may not start immediately upon completion of the consumer task, e.g. if cache invalidation circuitry is still busy with invalidations for previously designated invalidation target address ranges.

Even if the cache invalidations have not started yet, the hazard detection to check for hazards between write requests and the cache invalidation requests for the given invalidation target address range may begin earlier than the time at which the cache invalidations are started. This may be useful in cases where dependencies between a consumer task corresponding to an earlier version of buffered data in the given invalidation target address range and a subsequent producer task that produces a later version of buffered data in the given invalidation target address range are tracked at granularity finer than the size of the overall buffer. In this case, it is possible that a part of the producer task that writes to one region of the given invalidation target address range may start while a part of the consumer task may still be finishing reading from another region of the given invalidation target address range. Tracking the invalidation target address range at the same granularity corresponding to the regions for which producer-consumer dependencies are tracked may be complicated, so it may be that the invalidate-write hazards are detected based on a comparison of write target addresses with range defining information for the entire range, even if dependencies between an earlier consumer task and a later producer task are tracked at finer granularities. This may mean it is better to start hazard detection when any write starts to be performed for the later producer task, even if the cache invalidations have not yet started because there is still part of the earlier consumer task outstanding.

Hence, there can be a number of reasons why the actual cache invalidations do not need to occur immediately when the given invalidation target address range is allocated to be tracked by the invalidation range tracking circuitry. This opens up the possibility that, at the point when write operations begin for a later producer process that reuses the same address range as an earlier consumer process, it is possible that cache invalidation requests may not actually have started being generated yet for the previously instructed invalidation.

Therefore, it can be useful for the invalidation range tracking circuitry to maintain, for each invalidation target address range tracked by the invalidation range tracking circuitry:

an invalidating indication indicative of whether the cache invalidation circuitry has started generation of cache invalidation requests corresponding to that invalidation target address range; and a hazard indication indicative of whether at least one invalidate-write hazard has been detected for a memory write request specifying a target write address in that invalidation target address range.

This can be helpful for enabling different response actions to be triggered depending on whether, at the point of detecting a hazard, the invalidation process has already started for generating cache invalidation requests for the corresponding invalidation target address range.

For example, in response to detecting an invalidate-write hazard for a given memory write request specifying a write target address in a given invalidation target address range tracked by the invalidation range tracking circuitry, the invalidate-write hazard being detected before any cache invalidation requests have been generated by the cache invalidation circuitry for the given invalidation target address range, the invalidate-write hazard detection circuitry may perform an invalidation cancelling action to prevent the cache invalidation circuitry generating cache invalidation requests for the given invalidation target address range, and allow the given memory write request to proceed. In this case, it can be more performance-efficient to allow the given memory write request to proceed (and hence overwrite cached data which would otherwise have been invalidated), and cancel the cache invalidation process for the given invalidation target address range. This can allow the part of the processing workload that includes the given memory write request to progress sooner than if the given memory write request was held back to allow the cache invalidation process to be started and completed. The invalidating indication tracked by the invalidation range tracking circuitry for the given invalidation target address range may be used to detect that no cache invalidation requests have yet been generated by the cache invalidation circuitry for that range.

On the other hand, in response to detecting an invalidate-write hazard for a given memory write request specifying a write target address in a given invalidation target address range tracked by the invalidation range tracking circuitry, the invalidate-write hazard being detected after at least one cache invalidation request has already been generated by the cache invalidation circuitry for the given invalidation target address range, the invalidate-write hazard detection circuitry may: control the cache invalidation circuitry to halt generation of further cache invalidation requests corresponding to the given invalidation target address range; and prevent the given memory write request being serviced until any previously generated cache invalidation request has been acknowledged as being guaranteed to complete. In this case, if cache invalidations have already started for a range which conflicts with the write target address of the given memory write request, it is safer to hold back the given memory write request from being serviced (e.g. by preventing its translation request being serviced as mentioned above), to ensure there can be no errors caused by invalidating a cache entry without writeback after the given memory write request has updated dirty data in that cache entry. The invalidating indication tracked by the invalidation range tracking circuitry for the given invalidation target address range may be used to detect that cache invalidation requests have already been generated by the cache invalidation circuitry for that range.

In response to completion of a cache invalidation process corresponding to a given invalidation target address range tracked by the invalidation range tracking circuitry without any invalidate-write hazard being detected, or halting or cancellation of the cache invalidation process in response to an invalidate-write hazard being detected, the invalidation range tracking circuitry may invalidate a tracking entry used by the invalidation range tracking circuitry to track the given invalidation target address range. At this point, it is no longer needed to detect invalidate-write hazards for that range and so performance can be improved by invalidating the corresponding tracking entry, preventing unnecessary delays to servicing memory write requests.

In some examples, the invalidate-write hazard detection circuitry is configured to detect invalidate-write hazards for memory write requests issued by a given memory write initiator. While the initiator could be any source of memory write requests in a data processing system, the technique described above can be particularly useful for an initiator that is processing graphics or media workloads, such as a graphics processing unit (GPU) or a hardware accelerator. For such initiators, it is common for software to request that the GPU or accelerator processes a buffer of data, which once complete and consumed by a dependent consumer process running on the same initiator device will no longer be needed for any other purpose, so that the corresponding data can be discarded from one or more caches to avoid unnecessary power in memory writebacks from the caches. Hence, a GPU or other hardware accelerator (especially those involved with processing of media data such as video data) can particularly benefit from the techniques discussed above.

While the invalidations triggered by the cache invalidation circuitry can also trigger invalidation from local private caches associated with the given memory write initiator, it can be useful if the cache invalidation requests are capable of causing invalidation of cache entries from a system cache shared between the given memory write initiator and at least one central processing unit (CPU). Typically such a system cache may have greater cache capacity than private caches and is more likely to contain the no longer needed dirty data from earlier render passes processed by a GPU or media accelerator, so it can be particularly beneficial to trigger invalidations in the system cache to save the power that would otherwise be consumed in writing back the data to main memory on natural eviction of the data from the system cache.

Specific examples will now be described with reference to the accompanying drawings.

FIG. 1 schematically illustrates an example of a data processing system 2. The system 2 comprises a number of memory access initiators, which share access to memory storage 20 accessed via a system interconnect 10. In this example, the memory access initiators include a CPU (Central processing unit) 4, GPU (graphics processing unit) 6 and a hardware accelerator 8. While only one initiator of each type (CPU, GPU and hardware accelerator) is shown in the example of FIG. 1, it will be appreciated that there could being more than one initiator of a given type. Also, it is not essential to include all of the types of initiator 4, 6, 8 shown in FIG. 1, and other examples may also support other types of memory access initiator.

The initiators may include one or more private caches 14, for caching data and/or instructions obtained from memory 20 via the interconnect 10. Also, each initiator may be associated with memory permissions checking circuitry 12, 15, 16 for checking whether access permissions associated with a given address specified as a target for a memory access are satisfied. For example, the CPU 4 and GPU 6 both include a memory management unit (MMU) 12. The accelerator in this example includes a memory protection unit (MPU) 15 and is also associated with a system memory management unit (SMMU) 16 (which may be shared with other initiators not shown in FIG. 1). The MMU 12 and SMMU 16 are responsible for address translation between virtual and physical address spaces (via one or two stages of address translation), and also implement permission checks based on access permissions specified in entries of translation table structures used to provide the address translation mappings for the address translation. The MPU 15 does not provide address translation, but provides the ability to define access permissions for arbitrarily sized regions of memory address space (e.g. with support for the regions being specified to have a size other than an exact power of 2 number of bytes).

The interconnect 10 may have coherency control logic for managing coherency of data cached in the private caches 14 of the memory access initiators 4, 6, 8. Any known coherency protocol can be used to manage cache coherency. The interconnect 10 may have a system cache 18 shared between the memory access initiators 4, 6, 8, providing a last level of cache before main memory 20. The memory 20 may comprise DRAM (dynamic random access memory) storage, or memory storage based on memory cells implementing using memory storage technologies other than DRAM.

FIG. 2 illustrates in more detail some components of the GPU 6. It will be appreciated that this is just one example, so other GPUs 6 could have a different configuration, and also that FIG. 2 is a simplified diagram and so the GPU could also have other components not illustrated in FIG. 2 for conciseness.

As shown in FIG. 2, the GPU 6 has a number of shader cores 30 for performing processing operations in parallel. For example, for a graphics processing algorithm, the shader cores 30 can be used to carry out graphics computation tasks such as vertex processing, geometry processing and fragment shading. When a GPU is used for other non-graphics workloads (e.g. for machine learning processing or other workloads where highly parallel processing is useful), other tasks may be performed by each shader core 30. The tasks to be performed may be defined by the software instructions executed by each shader core 30. Task management circuitry 32 may manage the allocation of tasks to particular shader cores 30. The shader cores 30 can access the GPU's cache 14 via the GPU's control fabric 36, as well as triggering memory access requests for accessing wider system memory 20.

As noted above, the GPU 6 comprises an MMU 12 for performing memory address translation and access permission checking for the memory access requests issued by the shader cores 30 for accessing the cache 14 and/or system memory 20. The address translation mappings used to carry out virtual-to-physical address translation and the associated access permissions (e.g. read/write/execute permissions) are obtained by the MMU 12 from translation table data structures stored in the memory system 20, e.g. by performing a "page table walk" to traverse multi-level translation table structures to obtain the address translation information and access permissions. Once obtained, the address translation mapping information and access permissions can be cached in one or more TLBs (translation lookaside buffers) 34 for faster access, so that the slow page table walk can be avoided on subsequent accesses to addresses in the same page (a "page" being a block of addresses which share the same entry in the translation table structure providing the address translation mapping/permissions data). In the example of FIG. 2, a distributed set of TLBs 34 is provided, with each individual shader core 30 being associated with its own local TLB 34 so that its corresponding TLB can cache information from translation table entries relating to the addresses recently accessed by that shader core 30.

Hence, when a shader core 30 needs to issue a memory access request, the target virtual address of that request is looked up in the TLB 34 associated with that shader core 30, and if the address hits in the TLB 34, the target virtual address can be translated to a physical address using the cached address translation mapping obtained from the TLB tures (e.g. a stage 1 translation from a virtual address to an intermediate address using stage-1 translation tables set by an operating system and a stage 2 translation from an intermediate address to a physical address using stage-2 translation tables set by a hypervisor). Once the required translation table information is available, it can be used to translate the target virtual address into a physical address and perform the relevant access permission checks, and if the permissions checks are passed this can cause the corresponding translation table information to be cached in the local TLB 34 of the shader core 30 which initiated the memory access, as well as causing an access request to be sent to the cache 14 or memory 20 based on the translated memory address.

As shown in FIG. 2, the GPU 6 may include a discard manager 40, for managing discarding of cached data from caches 14, 18 (including the GPU's private cache 14 and the system cache 18) when software has designated that data for a given range of addresses is no longer needed by any subsequent processing even if the data is dirty in the cache 14, 18 and has not yet been written back to memory. The discard manager 40 can be useful for improving memory system performance when processing GPU workloads, because for such workloads because it can be common for the shader cores 30 to write data to application-managed buffer structures in memory, which after a defined point in the program are no longer required for any subsequent processing. An example of such a workload is as follows:

| Fragment stream | Compute Stream |
|---|---|
| RUN_FRAG 1 (Writes to Image X) | WAIT (on RUN_FRAG 1 completion) |
| RUN_FRAG 3 (Reads Image Y and Writes to Image Z) | RUN_COMPUTE 1 (Reads Image X) |
| WAIT (on RUN_COMPUTE 1 completion) | VA_RANGE_INVALIDATE (Image X) |
| RUN_FRAG 4 (Writes to Image X) | |

34. A local access permission checking unit associated with the TLB 34 may check the access permissions defined for the target virtual address, and if the permissions are violated (e.g. a write request has been issued to an address associated with a read-only permission) then a fault can be signalled. If the access passes the relevant permissions checks then the memory access request can be issued to the cache 14 or to other parts of the memory 20, without needing the MMU 12 to perform any translation table walk operations. If the request misses in the TLB 34 (or hits against an entry of the TLB 34 set to a state which requires further checking with the MMU 12), then a translation request is sent to the MMU 12 which uses a translation table structure base address (defined in registers of the MMU 12) and various portions of the target virtual address to construct memory addresses of locations in memory 20 from which translation table entries can be obtained. In some cases, multiple accesses may be required to step through a multi-level translation table, where an access to a higher-level table entry obtains a pointer which is combined with another portion of bits extracted from the target virtual address to obtain an address at which a further translation table entry can be obtained, and multiple steps of following such pointers may be performed to "walk" the translation table structure, until eventually a leaf table entry providing the required address translation mapping and access permissions is obtained. In some translation regimes, there may be multiple stages of address translation based on different translation table struc- Here, "Image X" may refer to a buffer structure in memory, accessed via a particular range of virtual addresses selected by software. For example, "RUN_FRAG 1" may be a given render pass performed to generate an intermediate image, which is further processed in a further render pass by "RUN_COMPUTE 1" within the compute stream. The fragment stream and compute stream may be allocated to different shader cores 30 of the GPU 6, for example. Once "RUN_COMPUTE 1" is complete, there may be no further need for the data generated by RUN_FRAG 1. Therefore, software can issue a discard command ("VA_RANGE_IN-VALIDATE") specifying the range of virtual addresses corresponding to Image X, for which any dirty data within the caches 14, 18 can be discarded even if dirty, without needing to write back the dirty data to memory 20. If such an invalidation command was not issued, the dirty data for Image X would remain resident in the caches 14, 18 and over time may gradually be written back to memory 20 as the entries used for the dirty data for Image X are naturally evicted from the caches 14, 18 due to cache capacity pressure, as other addresses are accessed later on. However, the inventors have recognised that in a system with a system cache 18 and running this type of workload on a GPU 6 or other media accelerator, a non-trivial amount of DRAM access bandwidth (e.g. around 30% of total DRAM access bandwidth) may be occupied in such unnecessary writebacks to memory 20 of dirty data which will never be accessed by any subsequent request. By including support for the discard command which may instruct hardware to invalidate the cache entries corresponding to the specified address range, a significant amount of memory system bandwidth can be saved, thus saving power and improving overall system performance because that bandwidth can be used for other more useful purposes.

However, a challenge with this approach is managing invalidation-write hazards. As indicated in the example shown above, the fragment stream may subsequently include a further portion of processing (RUN_FRAG 4) which writes to the same virtually addressed buffer structure designated as Image X. For example, it may be simpler for software to manage only a limited number of virtual addressed buffers in memory, so once it is confirmed that any consumer of one pass of generating the data for the Image X buffer is complete (e.g. when RUN_COMPUTE 1 in the example above is complete), the buffer can be reused for another pass and so writes can start to be performed targeting the same region of memory previously designated as subject to invalidation. The cache invalidation process for a given virtually addressed range of memory may be relatively slow, as the cache invalidation manager may need to walk through each address in the range, triggering corresponding address translation operations and invalidation requests (e.g. specifying corresponding physical addresses) to invalidate any cache entry that specifies data corresponding to the target address range specified for invalidation. Also, when invalidating from the system cache 18, which may be remote from the discard manager 40 within the GPU 6, there may be a delay in the invalidation requests being acknowledged. Therefore, it is possible that the cache invalidation process may still be in progress when writes resume to the same address range previously designated as subject to cache invalidation. This risks a hazard, since if the write occurs before the corresponding cache entry has been subject to the cache invalidation, and the entry is subsequently invalidated, then the new data written for RUN_FRAG 4 may inadvertently be invalidated before it is able to be consumed by a subsequent consumer process, and this may lead to errors when out of date data in memory 20 is accessed by that consumer process when the consumer process should have seen the newer data produced by RUN_FRAG 4.

Hence, to guard against invalidate-write hazards, it may be desirable to put in place a mechanism to detect such hazards and prevent the write to a given address proceeding if there is still a risk that the corresponding cache entry for that address could still be invalidated as part of an invalidation process triggered based on a previous instance of the discard command (VA_RANGE_INVALIDATE). Previous approaches to this problem may require increased software overhead, e.g. implementing a barrier instruction (similar to the WAIT commands shown above) which prevents RUN_FRAG 4 being executed at all until the invalidation process triggered by VA_RANGE_INVALIDATE is complete, or by temporarily setting page table permissions to read-only for the virtual address region corresponding to Image X until the invalidation process is complete. However, these approaches tend to decrease performance and are onerous to implement for software developers.

Instead, in the examples of FIGS. 1 and 2, the GPU 6 has a discard manager 40 implemented in hardware, which provides a hardware mechanism for triggering discard operations (cache invalidations without writeback even if the invalidated data is dirty) and tracking the addresses ranges subject to such discard operations so that invalidate-write hazards can be detected and resolved. While the discard manager 40 is shown separate from the MMU 12 in FIGS. 1 and 2, in other examples the discard manager 40 could be considered to be part of the MMU 12.

Figure 3:
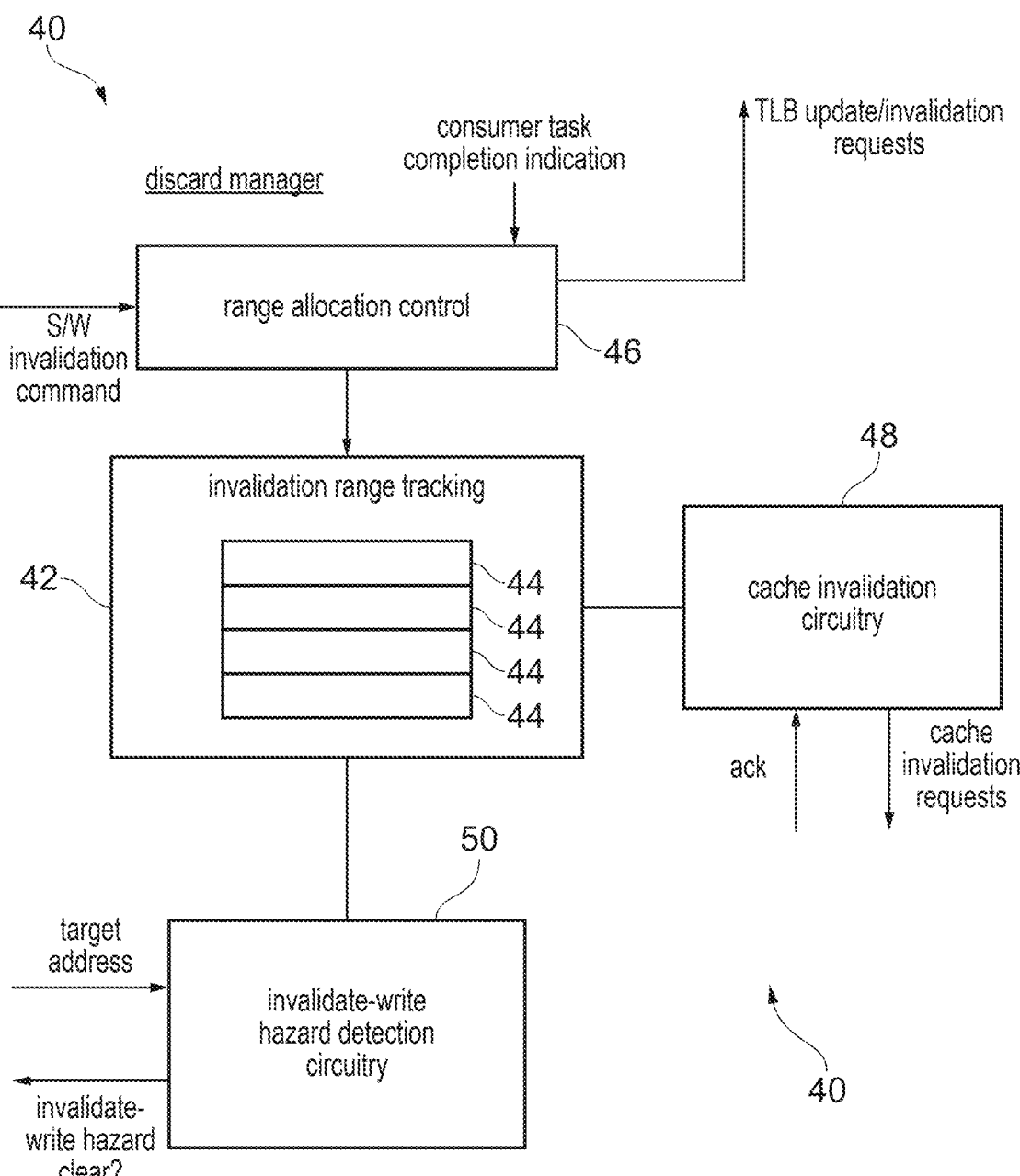
FIG. 3 illustrates an example of a discard manager comprising invalidation range tracking circuitry, cache invalidation circuitry and invalidate-write hazard detection circuitry.

FIG. 3 illustrates an example of the discard manager 40. The discard manager 40 includes range allocation control circuitry 46 for controlling allocation of new invalidation target address ranges to tracking entries 44 maintained by invalidation range tracking circuitry 42. Each tracking entry 44 can be set to track a corresponding range of addresses (e.g. a range of virtual addresses) designated by a software-triggered invalidation command (e.g. the VA_RANGE_IN-VALIDATE command mentioned above) as being a target for cache invalidation. In the GPU example, in response to the software-triggered invalidation command, the range allocation control circuitry 46 allocates a new entry 44 of the invalidation range tracking circuitry 42, and the range allocation control circuitry 46 also issues one or more TLB update/invalidation requests to the TLBs 34 requesting that, at least, the TLB entries corresponding to the addresses in the range specified by the invalidation command are either invalidated or updated to a state indicating that subsequent write requests to the addresses corresponding to those entries should cause a translation request to be sent to the MMU 12. This forces a subsequent write memory access request issued by the shader cores 32 for an address in the range subject to cache invalidation to miss in the TLB or hit against a TLB entry in a state indicating a translation request to the MMU 12 is required, causing a corresponding translation request to be issued to the MMU 12, allowing the address specified by the translation request to be checked with the discard manager 40 so that a translation response to the translation request can be delayed until it is confirmed that there is either no invalidate-write hazard or if there is an invalidate-write hazard that the hazard has been resolved. In some cases, the TLB update/invalidation requests issued to the TLBs 34 in response to allocation of a new entry 44 of the invalidation range tracking circuitry 42 may be specific, targeting only the entries corresponding to addresses in the newly allocated invalidation target address range. However, in other cases, the TLB updates/invalidations may be more coarse-grained, e.g. requesting update/invalidation of TLB entries associated with the same address translation context as the invalidation target address range allocated to the invalidation range tracking circuitry 42 (regardless of whether those TLB entries actually correspond to an address in the newly allocated invalidation target address range), or even requesting update/invalidation of all TLB entries regardless of address translation context. Hence, it will be appreciated that there is flexibility to implement different options for controlling TLB updates/invalidation.

Cache invalidation circuitry 48 is provided to control generation of cache invalidation requests for the address ranges tracked by valid entries 44 of the invalidation range tracking circuitry 42. The cache invalidation circuitry 48 may begin generating cache invalidation requests corresponding to a given invalidation target address range tracked in a given tracking entry once any consumer process which consumes the data associated with that address range has completed and there is sufficient invalidation bandwidth to issue cache invalidation requests. In some cases, hardware may be provided to track dependencies between commands specified by software (e.g. between the RUN_COMPUTE 1 command and the VA_RANGE_INVALIDATE command shown above), or between portions of the processing triggered by those commands (e.g. tracking dependencies at sub-region granularity), so that processing corresponding to a given part of a dependent command cannot begin until an earlier process which produces the data needed for that given part of the dependent command has completed. For example, a dependency tracking scoreboard may be used to track such inter-command dependencies. This hardware can be reused to monitor completion of the consumer task (e.g. the processing corresponding to RUN_COMPUTE 1 in the example above), and signal to the discard manager 40 when the consumer task is complete and the corresponding invalidation requests may begin for the invalidation command (VA_RANGE_INVALIDATE). It is possible, in some implementations where dependencies between commands are tracked based on sub-region granularity, that a part of RUN_FRAG 4 working on one sub-region of image X could start before the final part of RUN_COMPUTE 1 working on another sub-region of image X is complete, so even if the cache invalidations corresponding to VA_RANGE_IN-VALIDATE have not started yet, hazard detection between writes of RUN_FRAG 4 and the invalidations of VA_RANGE_INVALIDATE may start even before RUN_COMPUTE 1 has finished.

When the invalidation range tracking circuitry 42 tracks invalidation target address ranges based on virtual addresses, then for invalidations in a virtually-indexed/virtually-tagged cache, the cache invalidation circuitry 48 may walk through the address range to cause an invalidation request to be generated for each virtual address of a cache line within the invalidation target range, to cause the virtu-ally-indexed/virtually-tagged cache to invalidate corresponding cache entries (if present). On the other hand, if at least one cache 14, 18 subject to the cache invalidations uses physical addresses for indexing and/or tagging, then the series of virtual addresses generated according to the invalidation target address range by the cache invalidation circuitry 48 may be requested to be translated by the MMU 12 into corresponding physical addresses, and cache invalidation requests may then be issued to the cache(s) 14, 18 specifying the translated physical addresses. As the invalidation target address range can be relatively large, the invalidation process may take some time, as there may be a large number of invalidation requests to be serviced by the caches and there may be limited request bandwidth. Once the invalidation process is complete, the corresponding entry 44 in the invalidation range tracking circuitry 42 can be invalidated.

Invalidate-write hazard detection circuitry 50 is provided to check for invalidate-write hazards, based on the address ranges tracked by the invalidation range tracking circuitry 42. As mentioned above, since any TLB entries which could have been cached corresponding to the address range subject to invalidation are invalidated (or otherwise updated to indicate translation requests are required for write accesses hitting against that entry) at the point of allocating a new entry 44 in the invalidation range tracker 42, this guarantees that the first write memory access request to an address in any given page of addresses that intersects with the invalidation target address range will cause a translation request to be sent to the MMU 12 requesting an address translation and permissions check. The write target address specified in such a translation request is passed to the invalidation-write hazard detection circuitry 50 which determines whether that target address is within any of the invalidation target address ranges specified by valid entries 44 of the invalidation range tracking circuitry 42. If there is a conflict between the write target address and one of the invalidation target address ranges specified in the tracker 42, then if the cache invalidation circuitry 48 has not yet started generating invalidation requests for the corresponding invalidation target address range, the invalidation process for that range is cancelled to prevent any subsequent invalidation requests being generated for that range, and the translation/permissions check can be allowed to proceed for the translation request that specified that write target address. If the cache invalidation circuitry 48 had already started generating invalidation requests for the corresponding invalidation target address range, generation of invalidation requests for a remaining part of the invalidation process can be cancelled, but the MMU 12 may be delayed from signalling completion of its translation/access permission checks for the write memory access request in response to the corresponding translation request until any previously issued cache invalidation requests for the corresponding invalidation target address range have been acknowledged as guaranteed to complete.

It is not necessary to perform the invalidate-write hazard checks for read memory access requests, as they do not cause any risk of hazards against the pending cache invalidations. Even if a read was reordered relative to a cache invalidation to the same address, in the absence of any write to that address, the read would either read the required data from the cache (if the read occurs before the invalidation) or from memory (if the read occurs after the invalidation), either of which may give the correct functional result.

FIG. 4 illustrates an example of the tracking structure maintained by the invalidation range tracking circuitry 42. As shown in FIG. 4, each tracking entry 44 comprises:
  indication of the start and end addresses of the corresponding invalidation target address range (while these are shown as absolute addresses in the example of FIG. 4, in other examples, one of the start and end addresses could be identified relative to the other of the start and end addresses, e.g. by defining a range size parameter or an offset relative to the other address);
  a context identifier indicating the address translation context associated with the virtual address range specified by the start/end addresses;
  a valid bit indicating that the entry is in use and needs to be checked;
  a hazard bit indicating that a write hazard (or, if reads are checked against the tracker, potential future write hazard) has been detected within the range; and
  an invalidating bit indicating that invalidation is active for the range (or more specifically that invalidation requests are in-flight for that range).

Hence, when the valid bit is set monitoring of the range described in that entry will be performed. Setting this bit may be associated with notification to the TLBs 34 to cause the TLBs to remove (or update to a state indicating that write requests to the corresponding addresses will need to be checked with the MMU 12) at least those TLB entries which contain a translated address for a virtual address corresponding to the invalidation target address range, thus forcing re-translation to occur and checking of the access with the discard manager 40.

When a translation request requesting virtual to physical translation and permissions checking is issued for a write access that misses in the TLBs 34 (or otherwise hits on a TLB entry indicating that an MMU check is required for the write access), a translation request is sent to the MMU 12 and discard manager 40, and the valid entries 44 within the tracking structure 42 are checked, and for each entry corresponding to a virtual address range which contains the virtual address specified by the translation request (and corresponds to the same address translation context as the address translation context specified by the translation request), the corresponding hazard bit is set.

When the cache invalidation circuitry 48 starts generating invalidation requests corresponding to the range of addresses tracked in a given entry 44 of the invalidation range tracking circuitry 42, the invalidating bit for the given entry is set. If a hazard has already been detected before the invalidating bit is set, then the invalidation process is cancelled. If a hazard is detected after the invalidating bit is set, then in addition to stopping further invalidation within the range, the translation request which causes the hazard to be detected is stalled until all previously issued invalidations in that range have completed (or at least acknowledged by a recipient as being guaranteed to complete), thus ensuring that data written to a cache in response to the new write is not invalidated by mistake.

Once the invalidation has completed the valid bit is cleared ensuring that no further tracking is done on that range and making it available for use later.

In the example of FIG. 3, the invalidation range tracking structure 44 tracks virtual address ranges, as the invalidation-write hazard checking is triggered by a translation request sent to the MMU to request permissions checking and obtaining of translation table information not available in the TLBs 34. Hence, there is a mechanism to ensure TLB entries corresponding to an address in a range tracked by a valid entry 44 are invalidated or updated at the point when the valid entry 44 is first allocated, and translation requests corresponding to write requests are checked against the discard manager 40.

However, in other examples, the triggering of invalidate-write hazard detection by the discard manager could be implemented separate from the translation request sent to the MMU 12. For example, a discard manager could be implemented at each TLB 34 to check for invalidate-write hazards at the point of looking up the TLB 34. In that case, there would be no need to invalidate or update TLB entries when allocating a new invalidation range tracking entry 44, and it would not be necessary to check addresses of read accesses using the invalidate-write hazard detection circuitry 50. However, in practice, the overhead of invalidate-write hazard detection can be greatly reduced by implementing the discard manager 40 alongside the MMU 12, as this means a single discard manager 40 can be shared for each of the distributed TLBs 34. It also reduces complexity as it is not necessary to signal the invalidation target address ranges to each distributed hazard-checking unit at each TLB 34 or handle synchronisation between the distributed hazard checking units and the cache invalidation circuitry 48.

While FIG. 4 shows an example where each entry 44 of the invalidation range tracking circuitry 42 tracks a single address range, other examples could provide entries 44 which support tracking of multiple discontiguous address ranges (either with shared hazard/invalidating bits for each range, or with separate hazard/invalidating bits per address range tracked in the same entry 44). This could reduce the overhead of tracking invalidation of multiple ranges associated with the same consumer process.

As shown in FIG. 1, in some examples, an accelerator 8 or other memory access initiator may have an MPU 15, which is a different type of memory permissions checking circuit compared to the MMU 12. The MPU 15 may similarly be associated with a discard manager 40 for tracking ranges subject to cache invalidation (discard operations) and checking for invalidate-write hazard detection. The discard manager 40 associated with the MPU 15 may be similar to that shown in FIG. 3, but does not need to trigger TLB invalidation/update requests as shown in FIG. 3, because for an MPU there may be no TLB that caches address translation information. The MPU 15 may enforce access permissions based on sets of registers which define, for each defined memory region, a start and end address of the region, where the register state supports the region having a size other than an exact power of 2 number of bytes. This can be useful for memory access initiators which do not require as fine-grained control of access permissions as is typically offered by MMUs 12 based on translation table structures, but for which the deterministic performance offered by an MPU 15 may be more attractive (the MMU 12 approach may risk very slow worst case translation latency in the case when a page table walk is needed).

When the discard manager 40 is implemented in association with an MPU 15, then when the MPU 15 receives a permissions check request specifying a given write target address for a write request for which an access permissions check is required, the signalling of completion of the permissions check can be delayed until the address specified in the write request is checked against the ranges defined in valid entries of the invalidation range tracking circuitry 42. Read requests do not need to be checked against the discard manager 40, as a read to a location associated with a pending cache invalidation will return the correct data regardless of whether the invalidation happens before or after the read. The response to a hazard can be the same as in the example described above (cancelling the pending invalidation process if a hazard is detected, and if the invalidation has already started, delaying a write request until any previously issued cache invalidation requests are guaranteed to complete).

In the example of FIG. 1, the MPU 15 of the accelerator 8 is looked up based on virtual addresses, which are subsequently translated into physical addresses by a downstream SMMU 16. In this case, the ranges tracked by the invalidation range tracking circuitry 42 in the discard manager 40 associated with the MPU 15 would be virtual addresses. However, in other examples, an accelerator 8 might issue memory access requests specifying physical addresses directly, and so may not issue memory access requests via an SMMU 16. In this case, the invalidation range tracking circuitry 42 can track the invalidation ranges as ranges of physical addresses, and hazarding is based on physical address rather than virtual addresses (also the cache invalidation requests generated by the cache invalidation circuitry 48 would in this case be generated specifying physical addresses, so there would be no need for subsequent translation of the addresses specified by cache invalidation requests). It is also possible that the invalidation ranges are tracked based on an intermediate address.

FIG. 5 illustrates steps for detection of invalidate-write hazards. At step 100, the invalidation range tracking circuitry 42 tracks at least one invalidation target address range specified as a target for cache invalidation. Each range of addresses tracked by the invalidation range tracking circuitry 42 may be a range specified by a discard command executed by software. At step 102, cache invalidation circuitry requests invalidation of cache entries corresponding to addresses in the one or more invalidation target address ranges tracked by the invalidation range tracking circuitry 42. At step 104, the invalidation-write hazard detection circuitry detects invalidation-write hazards based on comparison of the write target address specified by memory write request with the at least one invalidation target address range tracked by the invalidation range tracking circuitry 42. At step 106, if an invalidation-write hazard is detected for a given memory write request and a given tracked invalidation target address range, the given memory write request is prevented from being serviced until any previously issued cache invalidation requests (if any have been issued) for the given invalidation target address range have been acknowledged is guaranteed to complete.

FIG. 6 illustrates an example of steps for allocating a new address range to be tracked by the invalidation range tracking circuitry. At step 150 a discard command is executed by software, specifying invalidation target range identifying information identifying a range of addresses to be tracked as a new invalidation target address range. In response to the discard command being executed, at step 152 a new discard tracking entry 44 is allocated corresponding to the new invalidation target address range identified by the invalidation target range identifying information.

At step 154, if the discard manager is associated with an MMU 12 with distributed TLBs and the mechanism for ensuring invalidation-write hazard detection is triggered for a memory write request relies on a translation request being sent to the MMU 12, then at least one TLB update/invalidation request is issued to one or more TLBs 34, to request either invalidation of at least any TLB entries corresponding to addresses in the new invalidation target address range allocated to the tracking structure 42 or updating of those TLB entries to a state indicating that a subsequent write access request to an address corresponding to that TLB entry would require a translation request to be sent to the MMU 12 (e.g. that state may be a read-only state corresponding to read-only permissions being set for the corresponding memory region, or could be a dedicated "check with MMU" state which indicates that permission is not necessarily denied for the write request but that nevertheless a check with the MMU is needed). As mentioned above, it can be acceptable to apply such invalidations or updates to additional TLB entries not relating to the new invalidation target address range.

At step 156, the discard manager 40 waits for completion of any earlier initiated consumer process that consumes data from the new invalidation target address range. For example, the discard manager 40 may wait for a signal indicating that the consumer process has completed. For example, this may reuse mechanisms already provided for tracking dependencies between processes initiated in response to respective software commands, so that the invalidation process triggered by the discard command can be regarded as dependent on the consumer process (e.g. RUN_COMPUTE 1 in the example below) which consumes the data being discarded by the invalidations triggered by the discard command, and should not start until that consumer process is done.

Once any earlier initiated consumer process is complete, then (subject to available cache invalidation bandwidth—the cache invalidation circuitry 48 may already be busy with generating cache invalidation requests for other address ranges, so may have to wait until that is complete before starting invalidations for the new invalidation target address range), at step 158 the cache invalidation circuitry 48 can start generation of cache invalidation requests to request invalidation cache entries corresponding to addresses in the new invalidation target address range. When generation of cache invalidation request starts for the new invalidation target address range, the corresponding invalidating bit is set in the tracking entry 44.

FIG. 6 shows steps performed in a case where a new allocation of a tracking entry 44 is possible at step 152. In cases where the tracking structure 42 is already fully allocated, so that it is not possible to allocate a new tracking entry 44, then the discard command is determined to fail and so no cache invalidation process is performed for this discard command. If any consumer task completion indication relating to the consumer task on which the failed discard command is received by the discard manager 40, the discard manager 40 can ignore the consumer task completion indication. For example, in an implementation where, on allocation of a new invalidation target address range in the tracking structure 42, the component carrying out the corresponding consumer task is provided with an index of the tracking entry 44 allocated for that invalidation range so that the component can specify that index in the corresponding consumer task completion indication, then in cases where the discard command failed to allocate into the tracking structure 42, the component executing the consumer task could instead be given an index value which is outside the valid range of index values corresponding to the tracking entries 44, so that a consumer task completion indication specifying the out-of-range index value can be detected by the discard manager 40 as "to be ignored". Alternatively, the fact that the allocation of a new invalidation range in response to the discard command failed could be communicated to the component handling the consumer task to prevent the completion indication for the consumer task being sent to the discard manager 40 at all.

FIG. 7 illustrates steps for controlling invalidation of tracking entries 44 of the invalidation range tracking circuitry 42. At step 160, the discard manager 40 determines whether the invalidation process being performed by the cache invalidation circuitry 48 is complete for a given invalidation target address range, in a case where no invalidate-write hazard was detected. Once the invalidation process completes without any hazard being detected, then at step 162 the corresponding tracking entry 44 is invalidated, to allow that entry to be reused for tracking other invalidation ranges and prevent subsequent write accesses to the range being delayed.

Figure 8:
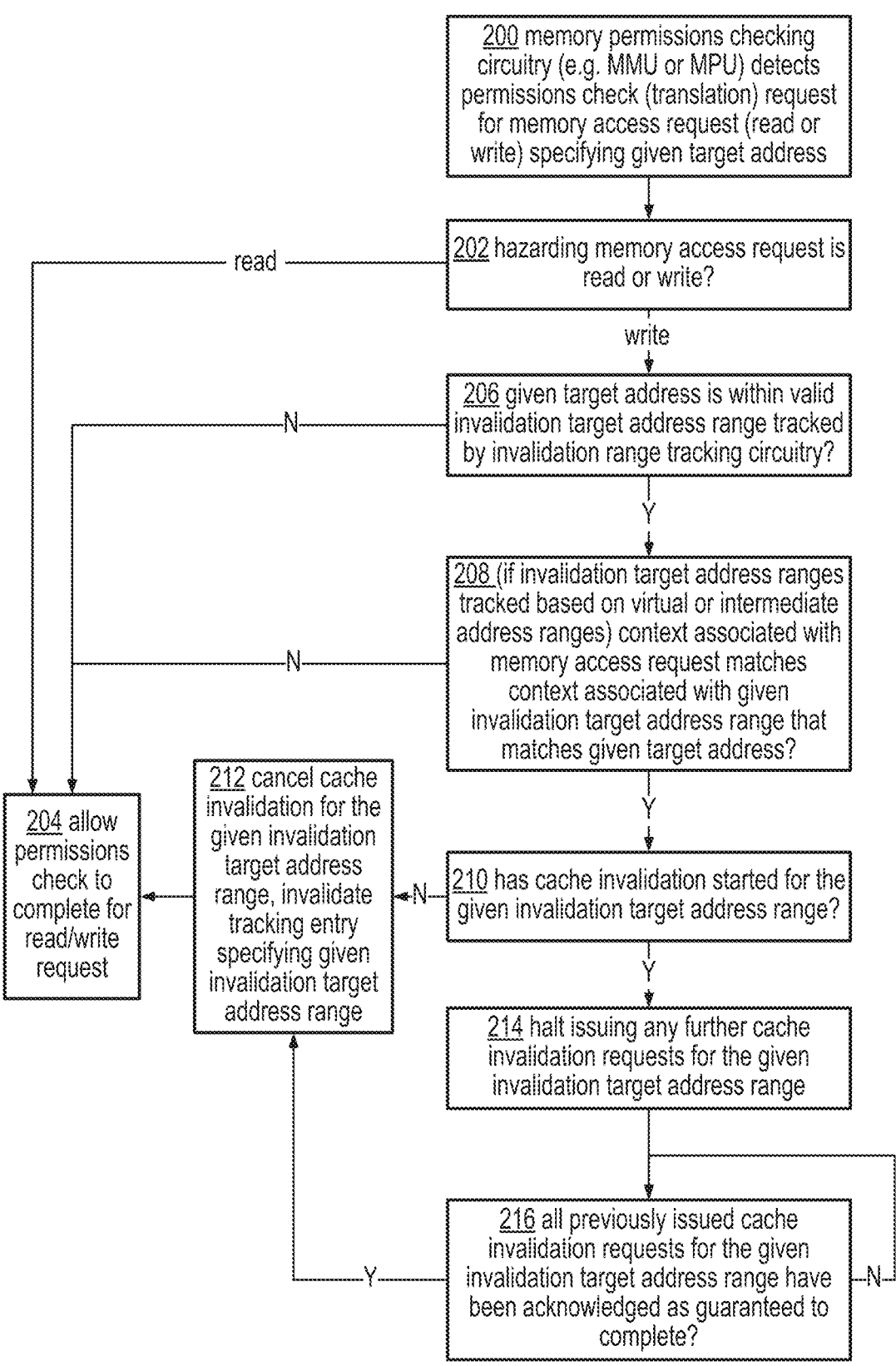
FIG. 8 illustrates steps for detecting, and responding to detection of, an invalidate-write hazard.

FIG. 8 illustrates steps for checking for invalidation-write hazards. At step 200, memory permissions checking circuitry (for example, the MMU 12 or MPU 15) detects a permissions check request for a memory access request (e.g. a read or write request) specifying a given target address. In the case where the memory permissions checking circuitry is the MMU 12, the given target address may be specified as a virtual address or an intermediate address, and the permissions check request may be a translation request, so may request an additional action in addition to the permissions check (e.g. the additional action can be address translation and/or obtaining address translation information from memory). In the case where the memory permissions checking circuitry is the MPU 15, the given target address may be specified as a virtual address, intermediate address or physical address, and the permissions check request does not request any address translation.

At step 202, it is determined whether the memory access request is a read or write memory access request. If the memory access request is a read request, then at step 204 the permissions check for the memory access that triggered the permissions check request is allowed to complete (including signalling any successful outcome of the permissions check, if checking of the permissions data indicates that the read request satisfies the access permissions set for the corresponding memory address). As there is no invalidate-write hazard for read requests, there is no need to delay handling of the memory access for reasons of invalidation-write hazard detection.

At step 206, if the memory access request for which the memory permissions check request was received is a write request, the invalidate-write hazard detection circuitry determines whether the given target address specified by the permissions check request is within a valid invalidation target address range tracked by the invalidation range tracking circuitry 42. If not, then at step 204 the permissions check for the memory access that triggered the permissions check request is allowed to complete (including signalling any successful outcome of the permissions check, if checking of the permissions data indicates that the write request satisfies the access permissions set for the corresponding memory address). As there is no invalidate-write hazard when the given target address does not correspond to any tracked invalidation target address range, there is no need to delay handling of the write memory access request for reasons of invalidation-write hazard detection.

If the invalidation target address ranges are tracked by the invalidation range tracking circuitry 42 as ranges of virtual addresses or intermediate addresses associated with a given context, then at step 208 an additional check is performed of whether the context (e.g. an address translation context) associated with the memory access request corresponding to the permissions check request received at step 200 matches the context specified by tracking entry 44 for the given invalidation target address range the matches the given target address. While step 208 is shown as a separate step from step 206 in FIG. 8 (performed sequentially after step 206), it will be appreciated that steps 206, 208 can be performed in parallel or in a different order. If invalidation target address ranges are tracked based on physical addresses, step 208 can be omitted. If step 208 is required and the given invalidation target address range detected as matching the given target address at step 206 corresponds to a different context from the context associated with the write memory access request being hazarded, then there is no need to signal a hazard and at step 204 the permissions check for the memory access request can be allowed to complete without delay.

If a given valid tracking entry 44 is detected for which the address range includes the given target address (Y at step 206) and, if a context identifier comparison is implemented, the context of the entry 44 is determined to match the context associated with the memory access request being hazarded (Y at step 208), then a potential invalidation-write hazard is detected.

At step 210 the discard manager 40 determines (based on the invalidating bit of the tracking entry 44 for which the potential hazard was detected) whether cache invalidation has started yet for the address range tracked by the given valid tracking entry determined to match at steps 206, 208. If invalidation has not yet started, then at step 212 the cache invalidation process is cancelled for the given invalidation target address range before it is even started, and the given valid tracking entry can be invalidated, and at step 204 the memory access request that triggered the hazard check may be allowed to proceed (the permissions check can complete).

If at step 210 it is determined that cache invalidation already started for the given invalidation target address range, then at step 214 issuing of any further cache invalidation requests for the given invalidation target address range is halted by the cache invalidation circuitry 48. At step 216 the hazard detection circuitry 50 waits for all previously issued cache invalidation requests for the given invalidation target address range to have been acknowledged as guaranteed to complete, before proceeding to steps 212 and 204 to cancel the cache invalidation process, invalidate the tracking entry specifying the given invalidation target address range which matched against the given target address of the memory access request, and allow the memory access request to proceed with/beyond the permissions check.

In the example of FIG. 8, the hazard checking is performed by the discard manager 40 only for write memory accesses, not for read memory accesses.

However, in other examples, the hazard checks could also be performed by the discard manager 40 for read memory accesses. For example, if the mechanism for ensuring that write memory accesses issued by various requesters 30 are checked by the discard manager 40 is to issue TLB invalidation requests to distributed TLBs 34 associated with the requesters 30, then as a read to an address that was the subject of a TLB invalidation could cause the corresponding TLB entry to be restored in one of the TLBs 34 (risking a subsequent write not being checked with the discard manager), it may be desirable to check read accesses against the ranges defined in the discard manager 40, and treat a given read to an address in one of the valid invalidation ranges as hazarding (even though reads do not necessarily conflict with invalidations), so that if cache invalidation has already started for that range then the translation request for the read is delayed from completing until the previously issued cache invalidations are guaranteed to complete. This ensures that it is not possible for a subsequent write to miss the hazard check even if an intervening read occurs between the TLB invalidation and the write.

However, in implementations which update the relevant TLB entries to a state indicating that writes should be checked with the MMU 12 (rather than invalidating those TLB entries), or implementations which do not rely on TLB invalidations as a mechanism for ensuring that write requests are checked with the discard manager 40 (e.g. if there is a separate signalling mechanism, separate from translation requests, for signalling requests to be checked with the discard manager 40), or implementations where the hazard checking is associated with an MPU not an MMU 12, there is no need to perform the invalidation-write hazard checks for read access requests.

While steps are shown in a particular order in the flow charts described above, it will be appreciated that this is just one possible example of a sequence of operations, and other examples may reorder the steps or perform steps at least partially in parallel.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 9:
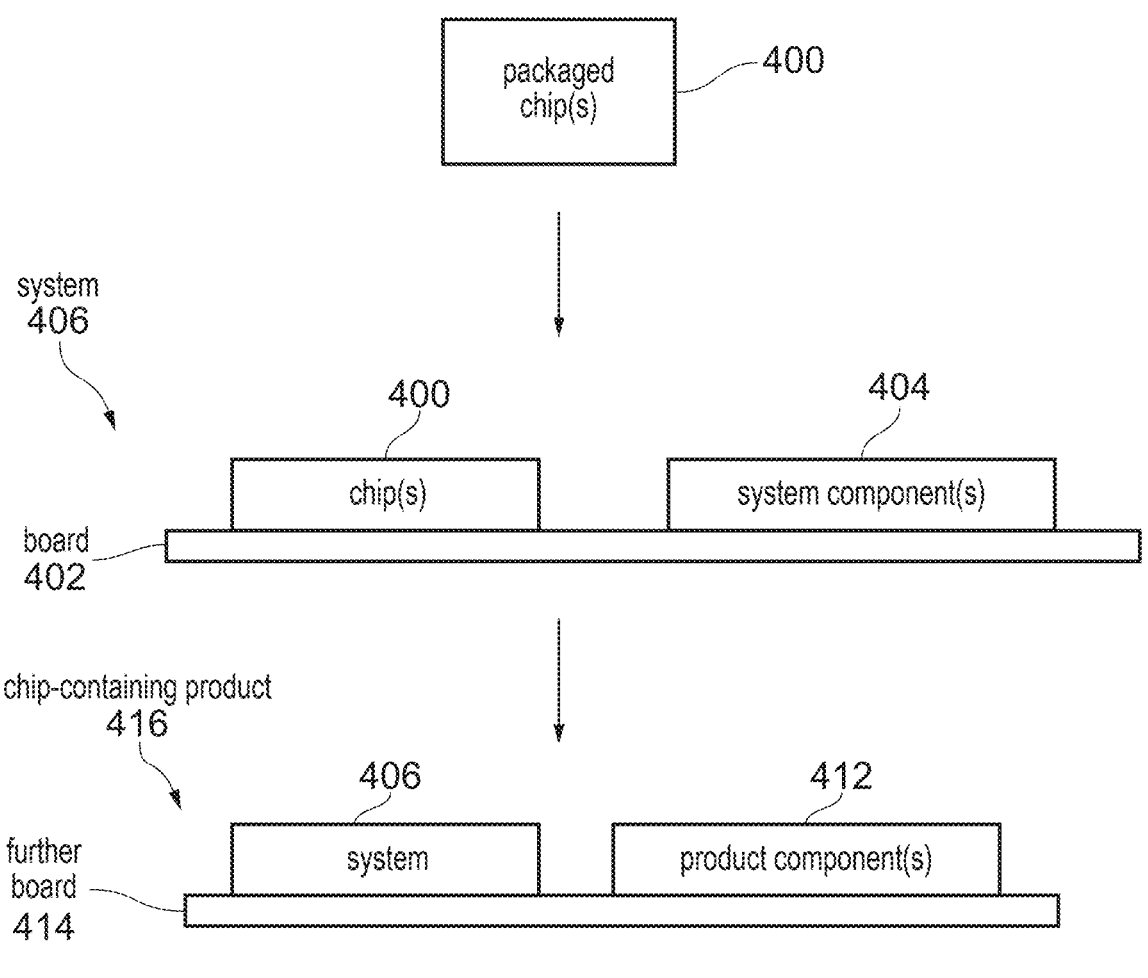
FIG. 9 illustrates a system and a chip-containing product.

As shown in FIG. 9, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:

invalidation range tracking circuitry to track at least one invalidation target address range specified as a target for cache invalidation;

cache invalidation circuitry to request invalidation of cache entries corresponding to addresses in said at least one invalidation target address range tracked by the invalidation range tracking circuitry; and invalidate-write hazard detection circuitry to detect invalidate-write hazards based on a comparison of a write target address specified by a memory write request with the at least one invalidation target address range tracked by the invalidation range tracking circuitry.

2. The apparatus according to clause 1, in which, in response to detecting an invalidate-write hazard for a given memory write request which specifies a write target address in a given invalidation target address range tracked by the invalidation range tracking circuitry, when at least one cache invalidation request has already been issued for the given invalidation target address range:

the invalidation-write hazard detection circuitry is configured to prevent the given memory write request being serviced until each cache invalidation request previously issued for the given invalidation target address range has been acknowledged as being guaranteed to complete.

3. The apparatus according to any of clauses 1 and 2, comprising memory permissions checking circuitry to perform a permissions check for a memory access request based on permissions data associated with a target address of the memory access request.

4. The apparatus according to clause 3, in which, in response to detecting an invalidate-write hazard for a given memory write request, the invalidation-write hazard detection circuitry is configured to prevent the memory permissions checking circuitry indicating that the permissions check for the given memory write request is successful until the invalidate-write hazard is resolved.

5. The apparatus according to any of clauses 3 and 4, in which in response to a permissions check request received by the memory permissions checking circuitry specifying a given write target address for which the permissions check is requested corresponding to a given memory write request, the invalidate-write hazard detection circuitry is configured to compare the given write target address specified by the permissions check request with the at least one invalidation target address range to determine whether an invalidate-write hazard is detected for the given memory write request.

6. The apparatus according to any of clauses 3 to 5, in which the memory permissions checking circuitry comprises memory management circuitry to obtain translation table data corresponding to the target address of the memory access request, the translation table data specifying the permissions data and address translation mapping information.

7. The apparatus according to clause 6, comprising at least one translation lookaside buffer to cache address translation data, and to trigger issuing of a translation request to the memory management circuitry in response to detecting a miss in the at least one translation lookaside buffer;

wherein in response to allocation of a new invalidation target address range to be tracked by the invalidation range tracking circuitry, the invalidation range tracking circuitry is configured to trigger the at least one translation lookaside buffer to invalidate or update translation lookaside buffer entries corresponding to the new invalidation target address range to indicate that a subsequent memory write request specifying an address corresponding to the new invalidation target address range should cause the translation request to be issued to the memory management circuitry.

8. The apparatus according to any of clauses 3 to 5, in which the memory permissions checking circuitry comprises memory protection circuitry.

9. The apparatus according to any of clauses 1 to 8, in which, in response to a software command specifying invalidation target range identifying information, the invalidation range tracking circuitry is configured to allocate, as a new invalidation target address range, a range of addresses identified by the invalidation target range identifying information.

10. The apparatus according to any of clauses 1 to 9, in which each invalidation target address range tracked by the invalidation range tracking circuitry is specified as a range of virtual addresses or a range of intermediate addresses.

11. The apparatus according to clause 10, in which each invalidation target address range tracked by the invalidation range tracking circuitry is associated with an address translation context identifier; and the invalidate-write hazard detection circuitry is configured to determine whether an invalidate-write hazard occurs for a given memory write request specifying a given write target address associated with a target address translation context, in response to detecting that the given write target address specified by the given memory write request is within an invalidation target address range associated with said target address translation context.

12. The apparatus according to any of clauses 1 to 11, in which, following allocation of a given invalidation target address range to be tracked by the invalidation range tracking circuitry, the cache invalidation circuitry is configured to start, in response to detection of completion of a consumer task that consumes data from addresses in the given invalidation target address range, generation of cache invalidation requests requesting invalidation of cache entries corresponding to addresses in the given invalidation target address range.

13. The apparatus according to any of clauses 1 to 12, in which the invalidation range tracking circuitry is configured to maintain, for each invalidation target address range tracked by the invalidation range tracking circuitry:

an invalidating indication indicative of whether the cache invalidation circuitry has started generation of cache invalidation requests corresponding to that invalidation target address range; and a hazard indication indicative of whether at least one invalidate-write hazard has been detected for a memory write request specifying a target write address in that invalidation target address range.

14. The apparatus according to any of clauses 1 to 13, in which, in response to detecting an invalidate-write hazard for a given memory write request specifying a write target address in a given invalidation target address range tracked by the invalidation range tracking circuitry, the invalidate-write hazard being detected before any cache invalidation requests have been generated by the cache invalidation circuitry for the given invalidation target address range:

the invalidate-write hazard detection circuitry is configured to perform an invalidation cancelling action to prevent the cache invalidation circuitry generating cache invalidation requests for the given invalidation target address range, and allow the given memory write request to proceed.

15. The apparatus according to any of clauses 1 to 14, in which, in response to detecting an invalidate-write hazard for a given memory write request specifying a write target address in a given invalidation target address range tracked by the invalidation range tracking circuitry, the invalidate-write hazard being detected after at least one cache invalidation request has already been generated by the cache invalidation circuitry for the given invalidation target address range:

the invalidate-write hazard detection circuitry is configured to:

control the cache invalidation circuitry to halt generation of further cache invalidation requests corresponding to the given invalidation target address range; and prevent the given memory write request being serviced until any previously generated cache invalidation request has been acknowledged as being guaranteed to complete.

16. The apparatus according to any of clauses 1 to 15, in which in response to completion of a cache invalidation process corresponding to a given invalidation target address range tracked by the invalidation range tracking circuitry without any invalidate-write hazard being detected, or halting or cancellation of the cache invalidation process in response to an invalidate-write hazard being detected, the invalidation range tracking circuitry is configured to invalidate a tracking entry used by the invalidation range tracking circuitry to track the given invalidation target address range.

17. The apparatus according to any of clauses 1 to 16, in which the invalidate-write hazard detection circuitry is configured to detect invalidate-write hazards for memory write requests issued by a given memory access initiator.

18. The apparatus according to clause 17, in which the given memory access initiator comprises a graphics processing unit (GPU).

19. The apparatus according to clause 17, in which the given memory access initiator comprises a hardware accelerator.

20. The apparatus according to any of clauses 17 to 19, in which the cache invalidation circuitry is configured to generate cache invalidation requests capable of causing invalidation of cache entries from a system cache shared between the given memory access initiator and at least one central processing unit (CPU).

21. A system comprising:

the apparatus of any of clauses 1 to 20, implemented in at least one packaged chip;

at least one system component; and a board, wherein the at least one packaged chip and the at least one system component are assembled on the board.

22. A chip-containing product comprising the system of clause 21, wherein the system is assembled on a further board with at least one other product component.

23. Computer-readable code for fabrication of an apparatus comprising:

invalidation range tracking circuitry to track at least one invalidation target address range specified as a target for cache invalidation;

cache invalidation circuitry to request invalidation of cache entries corresponding to addresses in said at least one invalidation target address range tracked by the invalidation range tracking circuitry; and invalidate-write hazard detection circuitry to detect invalidate-write hazards based on a comparison of a write target address specified by a memory write request with the at least one invalidation target address range tracked by the invalidation range tracking circuitry.

24. A computer-readable storage medium storing the computer-readable code of clause 23.

25. A method comprising:

tracking, using invalidation range tracking circuitry, at least one invalidation target address range specified as a target for cache invalidation;

requesting invalidation of cache entries corresponding to addresses in said at least one invalidation target address range tracked by the invalidation range tracking circuitry; and detecting invalidate-write hazards based on a comparison of a write target address specified by a memory write request with the at least one invalidation target address range tracked by the invalidation range tracking circuitry.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

invalidation range tracking circuitry configured to track at least one invalidation target address range specified as a target for cache invalidation by at least one discard command;

cache invalidation circuitry configured to request invalidation of cache entries corresponding to addresses in said at least one invalidation target address range tracked by the invalidation range tracking circuitry; and invalidate-write hazard detection circuitry configured to detect invalidate-write hazards based on a comparison of a write target address specified by a memory write request with the at least one invalidation target address range tracked by the invalidation range tracking circuitry in response to the at least one discard command occurring before the memory write request.

2. The apparatus according to claim 1, in which, in response to detecting an invalidate-write hazard for a given memory write request which specifies a write target address in a given invalidation target address range tracked by the invalidation range tracking circuitry, when at least one cache invalidation request has already been issued for the given invalidation target address range:

the invalidation-write hazard detection circuitry is configured to prevent the given memory write request being serviced until each cache invalidation request previously issued for the given invalidation target address range has been acknowledged as being guaranteed to complete.

3. The apparatus according to claim 1, comprising memory permissions checking circuitry to perform a permissions check for a memory access request based on permissions data associated with a target address of the memory access request, in which, in response to detecting an invalidate-write hazard for a given memory write request, the invalidation-write hazard detection circuitry is configured to prevent the memory permissions checking circuitry indicating that the permissions check for the given memory write request is successful until the invalidate-write hazard is resolved.

4. The apparatus according to claim 1, comprising memory permissions checking circuitry to perform a permissions check for a memory access request based on permissions data associated with a target address of the memory access request, in which in response to a permissions check request received by the memory permissions checking circuitry specifying a given write target address for which the permissions check is requested corresponding to a given memory write request, the invalidate-write hazard detection circuitry is configured to compare the given write target address specified by the permissions check request with the at least one invalidation target address range to determine whether an invalidate-write hazard is detected for the given memory write request.

5. The apparatus according to claim 1, comprising memory permissions checking circuitry to perform a permissions check for a memory access request based on permissions data associated with a target address of the memory access request, in which the memory permissions checking circuitry comprises memory management circuitry to obtain translation table data corresponding to the target address of the memory access request, the translation table data specifying the permissions data and address translation mapping information.

6. The apparatus according to claim 5, comprising at least one translation lookaside buffer to cache address translation data, and to trigger issuing of a translation request to the memory management circuitry in response to detecting a miss in the at least one translation lookaside buffer;

wherein in response to allocation of a new invalidation target address range to be tracked by the invalidation range tracking circuitry, the invalidation range tracking circuitry is configured to trigger the at least one translation lookaside buffer to invalidate or update translation lookaside buffer entries corresponding to the new invalidation target address range to indicate that a subsequent memory write request specifying an address corresponding to the new invalidation target address range should cause the translation request to be issued to the memory management circuitry.

7. The apparatus according to claim 1, in which, in response to a software command specifying invalidation target range identifying information, the invalidation range tracking circuitry is configured to allocate, as a new invalidation target address range, a range of addresses identified by the invalidation target range identifying information.

8. The apparatus according to claim 1, in which each invalidation target address range tracked by the invalidation range tracking circuitry is specified as a range of virtual addresses or a range of intermediate addresses.

9. The apparatus according to claim 1, in which, following allocation of a given invalidation target address range to be tracked by the invalidation range tracking circuitry, the cache invalidation circuitry is configured to start, in response to detection of completion of a consumer task that consumes data from addresses in the given invalidation target address range, generation of cache invalidation requests requesting invalidation of cache entries corresponding to addresses in the given invalidation target address range.

10. The apparatus according to claim 1, in which the invalidation range tracking circuitry is configured to maintain, for each invalidation target address range tracked by the invalidation range tracking circuitry:

an invalidating indication indicative of whether the cache invalidation circuitry has started generation of cache invalidation requests corresponding to that invalidation target address range; and a hazard indication indicative of whether at least one invalidate-write hazard has been detected for a memory write request specifying a target write address in that invalidation target address range.

11. The apparatus according to claim 1, in which, in response to detecting an invalidate-write hazard for a given memory write request specifying a write target address in a given invalidation target address range tracked by the invalidation range tracking circuitry, the invalidate-write hazard being detected before any cache invalidation requests have been generated by the cache invalidation circuitry for the given invalidation target address range:

the invalidate-write hazard detection circuitry is configured to perform an invalidation cancelling action to prevent the cache invalidation circuitry generating cache invalidation requests for the given invalidation target address range, and allow the given memory write request to proceed.

12. The apparatus according to claim 1, in which, in response to detecting an invalidate-write hazard for a given memory write request specifying a write target address in a given invalidation target address range tracked by the invalidation range tracking circuitry, the invalidate-write hazard being detected after at least one cache invalidation request has already been generated by the cache invalidation circuitry for the given invalidation target address range:

the invalidate-write hazard detection circuitry is configured to:

control the cache invalidation circuitry to halt generation of further cache invalidation requests corresponding to the given invalidation target address range; and prevent the given memory write request being serviced until any previously generated cache invalidation request has been acknowledged as being guaranteed to complete.

13. The apparatus according to claim 1, in which in response to completion of a cache invalidation process corresponding to a given invalidation target address range tracked by the invalidation range tracking circuitry without any invalidate-write hazard being detected, or halting or cancellation of the cache invalidation process in response to an invalidate-write hazard being detected, the invalidation range tracking circuitry is configured to invalidate a tracking entry used by the invalidation range tracking circuitry to track the given invalidation target address range.

14. The apparatus according to claim 1, in which the invalidate-write hazard detection circuitry is configured to detect invalidate-write hazards for memory write requests issued by a given memory access initiator;

in which the given memory access initiator comprises a graphics processing unit (GPU).

15. The apparatus according to claim 1, in which the invalidate-write hazard detection circuitry is configured to detect invalidate-write hazards for memory write requests issued by a given memory access initiator; and the cache invalidation circuitry is configured to generate cache invalidation requests capable of causing invalidation of cache entries from a system cache shared between the given memory access initiator and at least one central processing unit (CPU).

16. A system comprising:

the apparatus of claim 1, implemented in at least one packaged chip;

at least one system component; and a board, wherein the at least one packaged chip and the at least one system component are assembled on the board.

17. A chip-containing product comprising the system of claim 16, wherein the system is assembled on a further board with at least one other product component.

18. The apparatus according to claim 1, wherein the at least one discard command indicates that cache entries corresponding to the at least one invalidation target address range are discardable, even if the cache entries contain data which is dirty.

19. A non-transitory computer-readable medium storing computer-readable code for fabrication of an apparatus comprising:

invalidation range tracking circuitry to track at least one invalidation target address range specified as a target for cache invalidation by at least one discard command;

cache invalidation circuitry to request invalidation of cache entries corresponding to addresses in said at least one invalidation target address range tracked by the invalidation range tracking circuitry; and invalidate-write hazard detection circuitry to detect invalidate-write hazards based on a comparison of a write target address specified by a memory write request with the at least one invalidation target address range tracked by the invalidation range tracking circuitry in response to the at least one discard command occurring before the memory write request.

20. A method comprising:

tracking, using invalidation range tracking circuitry, at least one invalidation target address range specified as a target for cache invalidation by at least one discard command;

requesting invalidation of cache entries corresponding to addresses in said at least one invalidation target address range tracked by the invalidation range tracking circuitry; and detecting invalidate-write hazards based on a comparison of a write target address specified by a memory write request with the at least one invalidation target address range tracked by the invalidation range tracking circuitry in response to the at least one discard command occurring before the memory write request.

\* \* \* \* \*